United States Patent
Ahlstedt et al.

(10) Patent No.: US 9,061,425 B2
(45) Date of Patent: Jun. 23, 2015

(54) FRAME TRANSFER DEVICE FOR AN OPTICAL STRAIN GAUGE STRUCTURE

(71) Applicant: Avago Technologies General IP (Singapore) Pte. Ltd., Singapore (SG)

(72) Inventors: Magnus Ahlstedt, Regensburg (DE); Dawid Janse Van Vuuren, Pentling (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 87 days.

(21) Appl. No.: 14/054,057

(22) Filed: Oct. 15, 2013

(65) Prior Publication Data
US 2015/0103332 A1  Apr. 16, 2015

(51) Int. Cl.
*G01B 11/16* (2006.01)
*B25J 15/00* (2006.01)
*G01L 1/24* (2006.01)

(52) U.S. Cl.
CPC ............. *B25J 15/0047* (2013.01); *G01L 1/242* (2013.01)

(58) Field of Classification Search
CPC ........................................................ G01B 11/16
USPC ............................................................ 356/32
See application file for complete search history.

(56) References Cited

U.S. PATENT DOCUMENTS

2010/0134782 A1* 6/2010 Roberts et al. .................. 356/32
2011/0102766 A1* 5/2011 Kunigami et al. ............... 356/32

FOREIGN PATENT DOCUMENTS

| EP | 0640824 A1 | 8/1994 |
| WO | 94/29671 A1 | 12/1994 |
| WO | 97/15805 A1 | 5/1997 |

* cited by examiner

*Primary Examiner* — Roy M Punnoose

(57) ABSTRACT

An optical strain gauge, a transfer device for an optical strain gauge, and a test system are described. One instance of the disclosed transfer device includes a first and second gauge coupler that facilitate attachment to an optical strain gauge. The disclosed transfer device enables an optical strain gauge to be easily moved from one location to another; for example from a location of manufacture, testing, or calibration, to an object to be tested with the strain gauge or from one object to another object.

20 Claims, 9 Drawing Sheets

FRAME TRANSFER DEVICE FOR AN OPTICAL STRAIN GAUGE STRUCTURE

FIELD OF THE DISCLOSURE

The present disclosure is generally directed toward measurement devices and systems and more particularly transfer devices for strain gauges.

BACKGROUND

Various methods and systems exist for measuring stress, strain, curvature, and/or displacement of materials or structural members (e.g., objects). A strain gauge or strain gage is a device used to measure the strain of an object. The most common type of strain gauge consists of an insulating flexible backing which supports a metallic foil pattern. The gauge is attached to the object by a suitable adhesive. As the object is deformed, the foil is deformed, causing its electrical resistance to change. This resistance change, usually measured using a Wheatstone bridge, is related to the strain by the quantity known as the gauge factor.

Unfortunately, traditional strain gauges that rely on electrical resistance are limited in their applicability. First of all, such strain gauges are not ideal for measuring strain of large objects (e.g., deflections across a large distance). Second of all, resistance-based strain gauges tend to degrade when used outdoors.

Given the shortcomings of traditional strain gauges, there has been significant development in the field of optical strain gauges. Specifically, optical strain gauges have been developed to address the issues associated with measuring strain of large structures in addition to the degradation issue.

BRIEF DESCRIPTION OF THE DRAWINGS

The present disclosure is described in conjunction with the appended figures, which are not necessarily drawn to scale.

DETAILED DESCRIPTION

Embodiments of the present disclosure contemplate the use of optical fibers to provide a mechanism for measuring stress and/or strain of an object (e.g., an optical strain gauge). It is another aspect of the present disclosure to provide a mechanism for transferring an optical strain gauge from one location to another location. It is another aspect of the present disclosure to provide a transfer device that enables calibration of the optical strain gauge before or after the strain gauge has been positioned on the object under test.

Optical fibers are ideal for many applications because they can be relatively inert to environmental degradation, are light in weight, are not affected by electromagnetic interference, carry no electrical current, and can be configured to measure the stress, strain, and/or deflection of larger objects such as wind turbines, bridges, roads, buildings, towers, and the like.

While the examples of testing systems and objects under test will be described in connection with the utilization of an optics-based strain gauge, it should be appreciated that embodiments of the present disclosure are not so limited. Specifically, the transfer device disclosed herein can be used to transfer any type of strain gauge (e.g., an optical or non-optical-based strain gauge). Additionally, any type of object may be fitted with a strain gauge including, without limitation, large objects (e.g., buildings, bridges, houses, sky scrapers, towers, wind turbines, roads, tankers, etc.), medium objects (e.g., planes, boats, cars, buses, machinery, etc.), and/or small objects (e.g., tools, tires, engine components, etc.).

Figure 1:
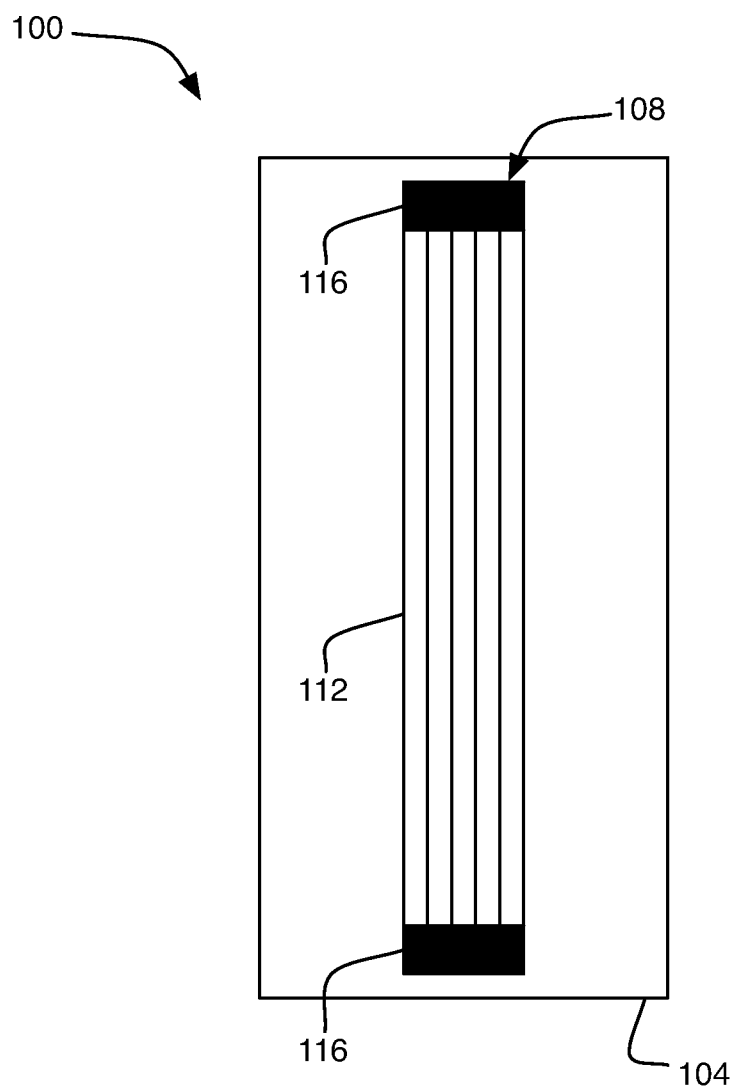
FIG. 1 depicts a test system in accordance with embodiments of the present disclosure.

With reference initially to FIG. 1, a testing system 100 will be described in accordance with embodiments of the present disclosure. The testing system 100 is depicted as including an object under test 104 (also referred to herein as object) and a strain gauge 108 physically attached to the object 104. While the strain gauge 108 is depicted as being positioned on an exterior surface of the object 104, it should be appreciated that the strain gauge 108 may be positioned on an interior surface of an objet 104, glued to an object 104, and/or may be embedded within an object 104. More specifically, the strain gauge 108 may be molded into the object 104 (e.g., incorporated into the object 104 during manufacture of the object) using any number of techniques. For instance, the strain gauge 108 may be placed into a material of the object 104 while the material is liquid, semi-liquid, or otherwise uncured. Once positioned in the material of the object 104, the object 104 may be cured, thereby fixing the position of the strain gauge 108 within the material of the object 104. Suitable materials that may accommodate such a configuration include, without limitation, curable polymers, curable epoxies, concrete, and the like. Once embedded into the object 104 and/or fixed to an outer surface of the object, the strain gauge 108 may be used to measure the expansion and/or contraction, strain, stress, deflection, movement, vibration, etc. of the object 104.

In the embodiment of the FIG. 1, the strain gauge 108 is depicted as including optical fiber 112 that meanders or traverses back and forth between two end caps 116. Additional details of a strain gauge 108 and its optical fiber 112 are described in U.S. Pat. No. 8,346,032 to Schilling et al., the entire contents of which are hereby incorporated herein by reference.

As will be described in further detail herein, the optical fiber 112 may meander between the end caps 116 in a number of different configurations. Specifically, the optical fiber 112 can wrap and circle back toward itself horizontally, vertically, or in some other manner at the end caps 116. Even more specifically, the end caps 116 may comprise one or more features that allow the optical fiber 112 to be bent vertically (e.g., away from the plane of the object 104 on which the strain gauge 108 is mounted), horizontally (e.g., substantially parallel with the plane of the object 104 on which the strain gauge 108 is mounted), or in some other orientation. By utilizing a strain gauge 108 as disclosed herein, embodiments of the present disclosure enable a maximization of the meander density of the optical fiber 112 without having the optical fiber 112 bend beyond its minimum allowable bending radius, which is usually defined by a manufacturer of the optical fiber 112.

Figure 2:
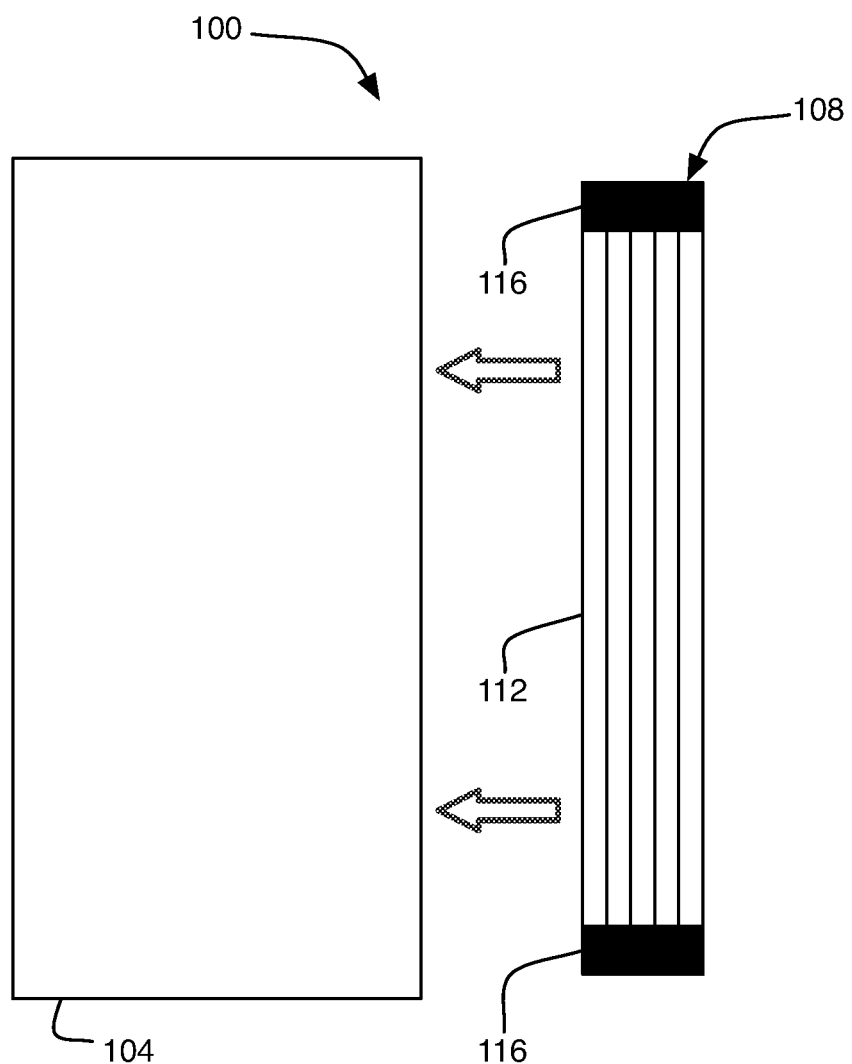
FIG. 2 depicts another configuration of a test system in accordance with embodiments of the present disclosure.

FIG. 2 shows the strain gauge 108 before it is positioned on the object 104. In particular, the strain gauge 108 is often manufactured separately from the object 104 and then the strain gauge 108 is transferred to the object 104 so that it can measure stresses, strains, deflections, etc. of the object 104.

In accordance with at least some embodiments of the present disclosure, a transfer device can be utilized to carry the strain gauge 108 to the object 104, even after the strain gauge 108 has been manufactured and/or calibrated. Accordingly, the strain gauge 108 can be calibrated before or after it has been positioned on the object 104. Furthermore, the end user can determine what a normal reading from the strain gauge 108 is (e.g., what range of electronic read-outs correspond to a non-deflected state of the object) and what operating range the strain gauge 108 will endure.

In the embodiment depicted in FIG. 1, after the strain gauge 108 is attached or coupled to the object 104, the strain gauge 108 will be configured to measure various parameters associated with motion of the object 104. Specifically, as the object 104 moves, contracts, expands, deflects, vibrates, or otherwise alters its physical orientation, one of the end caps 116 will move relative to the other end cap 116. The relative movement of end caps 116 will inherently change the length of the optical fiber 112, albeit minimally, thereby changing the optical signal received at the optical sensor. This change in optical signal is converted into an electrical signal at the optical sensor and the changes in the electrical signal are detected by a processor or ASIC attached thereto. These changes in electrical signal can be correlated to a stress, strain, deflection, or motion of the object 104.

Although FIG. 1 only depicts the object 104 as having a single strain gauge 108, it should be appreciated that the object 104 may be fitted with a plurality of strain gauges 108 without departing from the scope of the present disclosure. Specifically, a number of strain gauges 108 may be mounted on the object 104 to measure the deflection of the object 104 along a plurality of different axes.

Figure 3A:
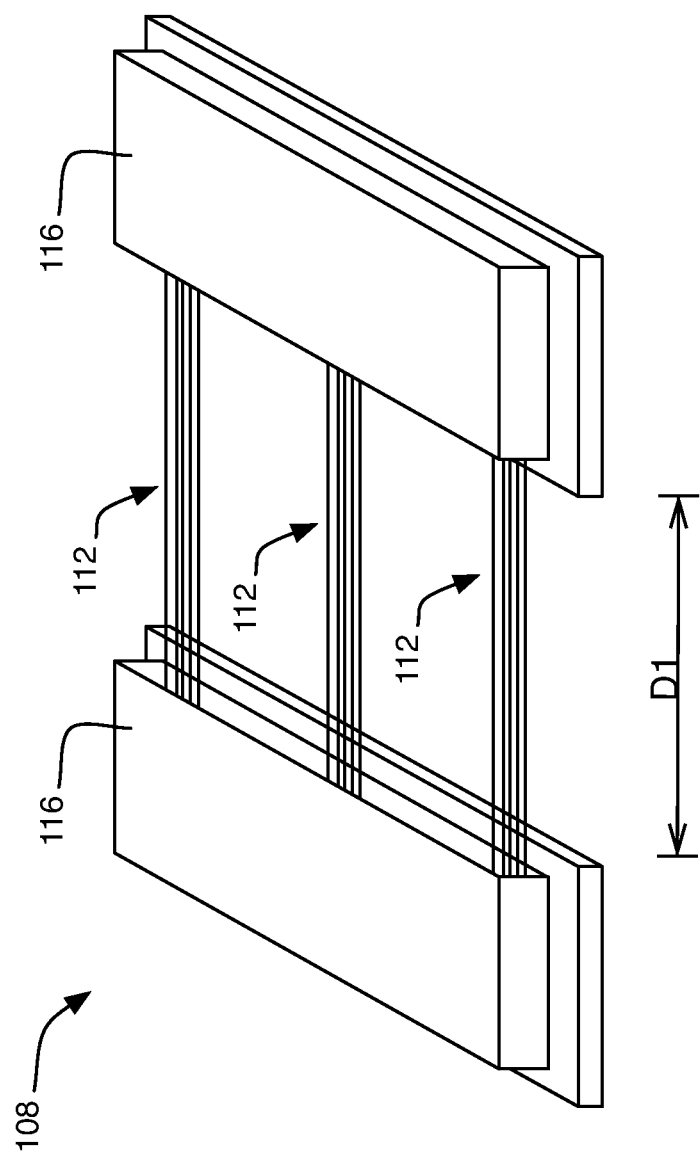
FIG. 3A depicts one example of an optical strain gauge in accordance with embodiments of the present disclosure.

With reference now to FIGS. 3A-3E additional details of a strain gauge 108 and a transfer device 204 for the same will be described in accordance with embodiments of the present disclosure. As discussed above, a strain gauge 108, in particular an optical strain gauge 108, may comprise two or more end caps 116 with optical fibers 112 meandering between the end caps 116. As shown in FIG. 3A, the end caps 116 may initially be separated by a first distance D1.

Figure 3B:
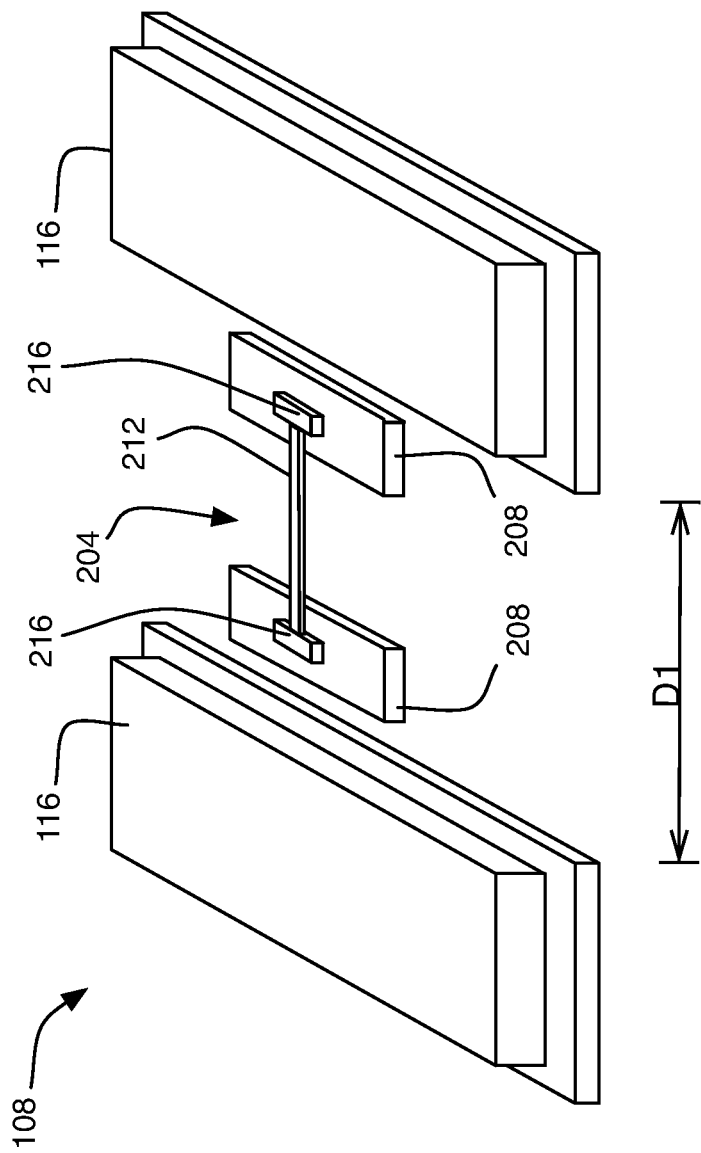
FIG. 3B depicts an optical strain gauge with a transfer device in a first state in accordance with embodiments of the present disclosure.

FIG. 3B shows a view of the strain gauge 108 without the optical fibers 112 for ease of illustration and description; however, it should be appreciated that the optical fibers 112 are still meandering between the end caps 116 of the strain gauge 108 for each of FIGS. 3B-3E. When it is desired to move or transfer the strain gauge 108, the transfer device 204 may be positioned between the end caps 116. In some embodiments, the transfer device 204 may comprise two or more end couplers 208, each having an expander attachment 216 coupled thereto. An expander 212 may be provided between the gauge couplers 208 to facilitate the outward expansion of the gauge couplers 208.

In some embodiments, the components of the transfer device 204 may be separate components or piece parts. In other embodiments, some components of the transfer device 204 may be integrally attached to one another. For instance, an expander attachment 216 may be integrally attached to a gauge coupler 208. As another example, the expander 212 may be integrally attached to one or both expander attachments 216. In some embodiments, the gauge couplers 208 are used to interface the transfer device 204 to the strain gauge 108. In a more specific, but non-limiting, embodiment, the gauge couplers 208 may couple the transfer device 204 to the strain gauge 108 via the end caps 116.

Figure 3C:
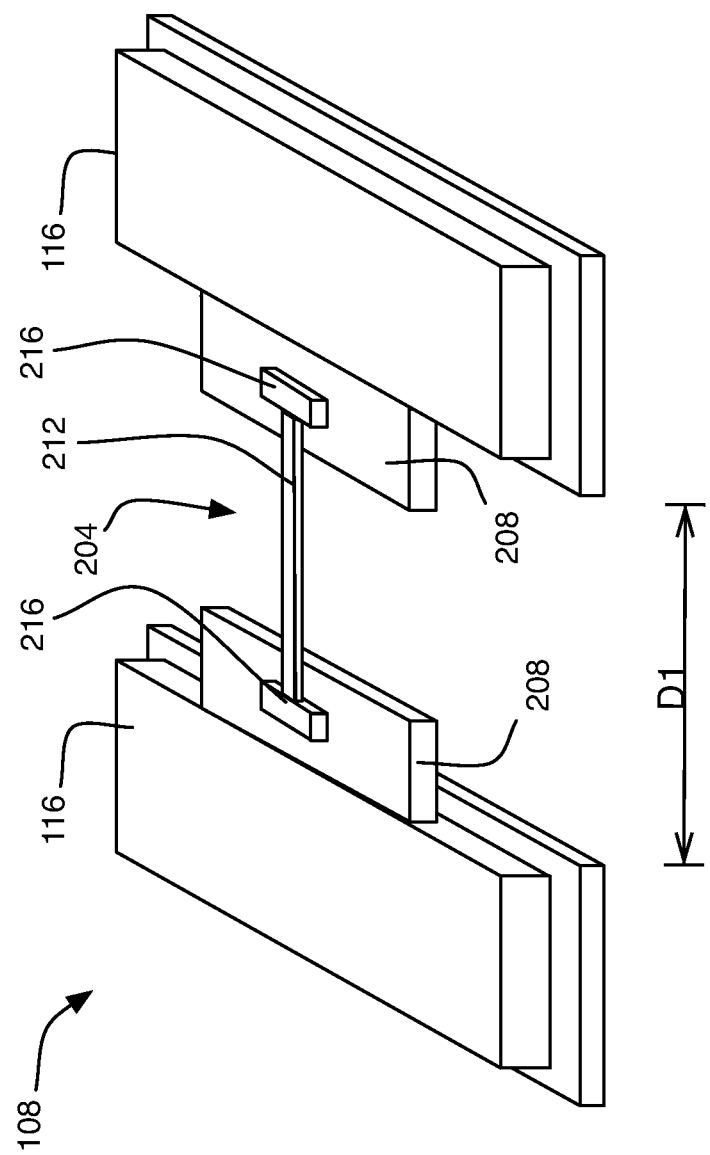
FIG. 3C depicts an optical strain gauge with a transfer device in a second state in accordance with embodiments of the present disclosure.

As shown in FIG. 3C, once the transfer device 208 is positioned between the end caps 116 of the strain gauge 108, the gauge couplers 208 can be expanded to interface with the end caps 116. In some embodiments, the gauge couplers 208 may be expanded via expansion of the expander 212. In other embodiments, the gauge couplers 208 may be separate components and can be interfaced directly with the end caps 116. Once the gauge couplers 208 have been interfaced with the end caps 116, the expander 212 can be expanded to connect with the expander attachments 216.

After the gauge couplers 208 have been expanded to interface with the end caps 116, an additional expansion force 220 may be provided via the expander 212, thereby expanding the distance between the expander attachments 216, the gauge couplers 208, and the end caps 116. More specifically, the expander 212 may be expanded to force the end caps 116 to a second distance D2, where the second distance D2 is greater than the first distance D1. As can be appreciated, the expansion of the end caps 116 may place the optical fibers 112 under tension. In other embodiments, the optical fibers 112 may be pre-tensioned and there may be an intrinsic strain on the gauge 108 while it is being transferred. In this scenario, the expander 212 is expanded until the gauge couplers 208 interface with the end caps 116, perhaps via a clip element, tongue and groove, male/female feature set, etc.

At this point, the strain gauge 108 may be moved 224 with the transfer device 204. In some embodiments, the strain gauge 108 may be moved 224 to its position on the object 104. In some embodiments, the strain gauge 108 may be moved 224 to a separate facility where the strain gauge 108 is tested.

Figure 4:
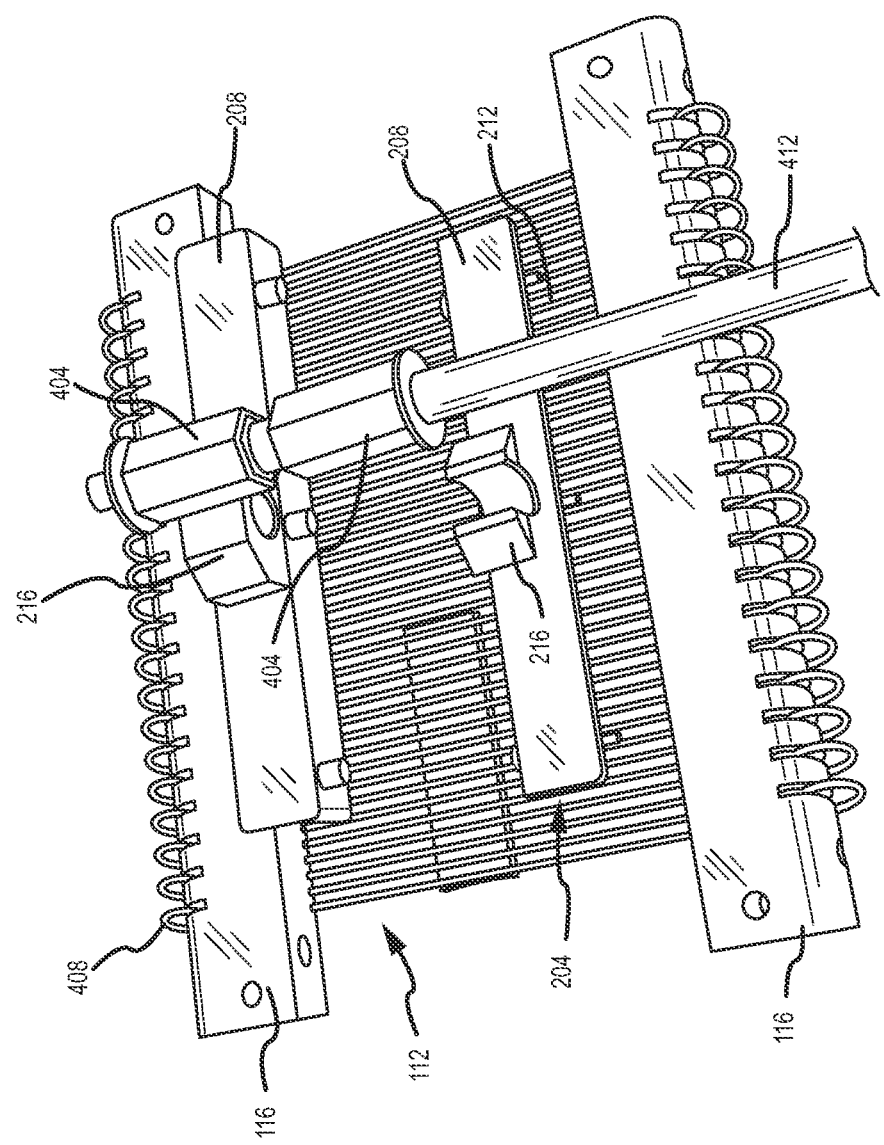
FIG. 4 depicts a second example of an optical strain gauge with a transfer device in accordance with embodiments of the present disclosure.

FIG. 4 shows a more specific, but non-limiting, embodiment of a transfer device 204 and strain gauge 108 in accordance with embodiments of the present disclosure. The transfer device 208 is shown to include separate piece parts for the gauge couplers 208. Moreover, each gauge coupler 208 is shown to have an integrally-formed expander attachment 216. The gauge couplers 208 may each have one or more features that enable the gauge couplers 208 to engage the end caps 116 at predetermined locations. More specifically, the gauge couplers 208 are shown to have male protrusion that interface with one or more female features on the end caps 116. The gauge couplers 208 are also shown to have an L-shape, which facilitates a coupling with the end caps 116 along two different surfaces of the end caps 116. Furthermore, one arm of the L-shape comprises the expander attachment 216 while the other arm comprises the male protrusions for interfacing with the end caps 116.

Figure 3D:
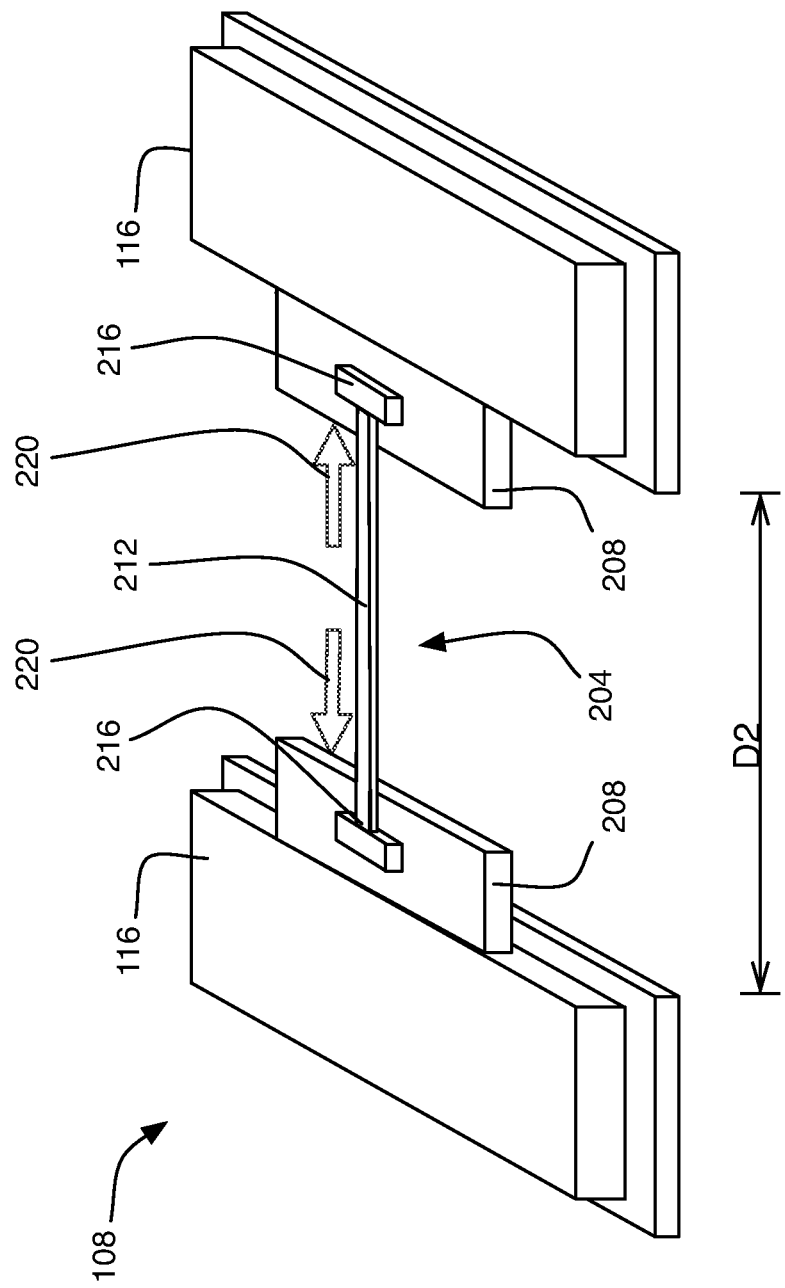
FIG. 3D depicts an optical strain gauge with a transfer device in a third state in accordance with embodiments of the present disclosure.
Figure 3E:
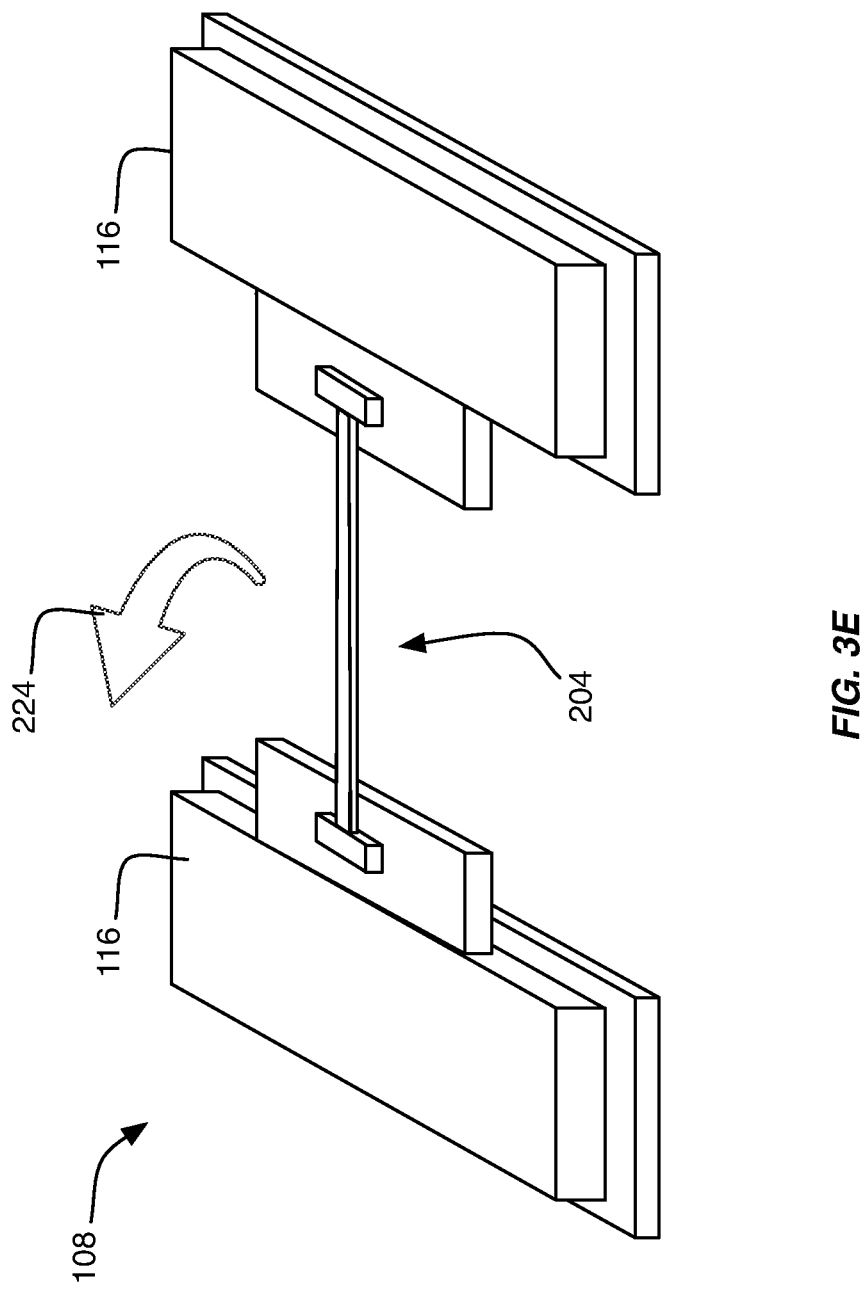
FIG. 3E depicts an optical strain gauge with a transfer device in a fourth state in accordance with embodiments of the present disclosure.

The expander 212 is shown to include a threaded rod 412 with expansion nuts 404 provided thereon. In some embodiments, the expander 212 may comprise one or more features that enable a user to easily grab and move the entirety of the transfer device 204. As a non-limiting example, the expander 212 may have a handle, strap, or grip connected thereto, which allows the user to grasp the expander 212 or something connected to the expander 212. The expansion nuts 404 are configured to move (e.g., via rotation) along the threaded rod 412, thereby facilitating the expansion forces 220. In some embodiments, the threaded rod 412 can be positioned moved toward the expander attachments 216 until the expansion nuts 404 are located between the expander attachments 216. Then, as shown in FIGS. 3B-3D, the expansion nuts 404 can be rotated and expanded along the threaded rod 412 until a sufficient expansion force 220 is created to separate the end caps 116 by a predetermined distance (e.g., a second distance D2). In some embodiments, the expansion nuts 404 are expanded until the end caps 116 reach an end of the meander wrap 408 and the optical fiber 112 is placed into tension. It should be appreciated that while an expansion nut 404 is shown as one example of a force-exerting component on the expander 112, embodiments of the present disclosure are not so limited. Instead, any type of device or collection of devices may be incorporated into the expander 112 to exert expansion forces between the end caps 116. Non-limiting examples of such force-exerting components include: threaded nuts, screws, un-threaded or smooth components, bolts, springs, hinges, clamps, gears, etc. Furthermore, the expander 112 may be configured to "pull" on the end caps 116 rather than pushing the end caps 116 outward. Further still, the functionality of the threaded rod 412 may be achieved with something other than a rod, such as a bar, post, series of linking components, or the like.

Although not shown, the end caps 116 may comprise a metal rod or the like that extends the length of the end cap 116, thereby facilitation a vertical wrapping of the optical fiber 112 about the rods of the end caps 116. Whether a vertical or horizontal wrapping of the optical fiber 112 is employed, the optical fiber 112, in some embodiments, is not bent more than the minimum bending radius of the optical fiber 112. In other words, the optical fiber 112 may comprise a minimum bending radius and the components of the end cap 116 around which the optical fiber 112 are wrapped may be sized to ensure that the meander wrap 408 does not go below the minimum bending radius defined for the optical fiber 112.

After the end caps 116 have been separated by a sufficient amount, the transfer device 204 can be used to carry the strain gauge 108 to the object 104 under test. In some embodiments, the transfer device 204 may remain coupled to the strain gauge 108 until the strain gauge 108 is completely attached to the object 104. As one example, the transfer device 204 may be used to hold the strain gauge 108 in an appropriate position until the end caps 116 have been fixed, fastened, glued, adhered, molded, or otherwise attached to the object 104. Alternatively or additionally, the transfer device 204 may remain coupled to the strain gauge 108 until some or all of the optical fibers 112 have been molded, adhered, or otherwise attached to the object 104. Once the strain gauge 108 has been attached to the object 104, the transfer device 204 may be uncoupled from the strain gauge 108, thereby enabling the transfer device 204 to be used to transfer another strain gauge 108. In some embodiments, one or more components of the transfer device 204 may remain with the strain gauge 108 in situ. In other embodiments, all components of the transfer device 204 are removed from the strain gauge 108. In still other embodiments, it may be possible that the gauge couplers 208 and/or expander attachments 216 are integral to the end caps 116, in which case the gauge couplers 208 and expander attachments 216 would have to remain with the strain gauge 108 during operation.

It should be appreciated that some or all of the components depicted and described herein can be manufactured from any number of materials. For instance, the components of the transfer device 204 and/or components of the strain gauge 108 may be constructed with one or more plastic, metal, or composite materials.

As discussed above, the strain gauge 108 may utilize a vertical, horizontal, or any other type of winding of the optical fibers 112, which means that the optical fiber 112 is wrapped in a plane that extends vertically away from the object 104 or in a plane substantially parallel with the object.

Figure 5:
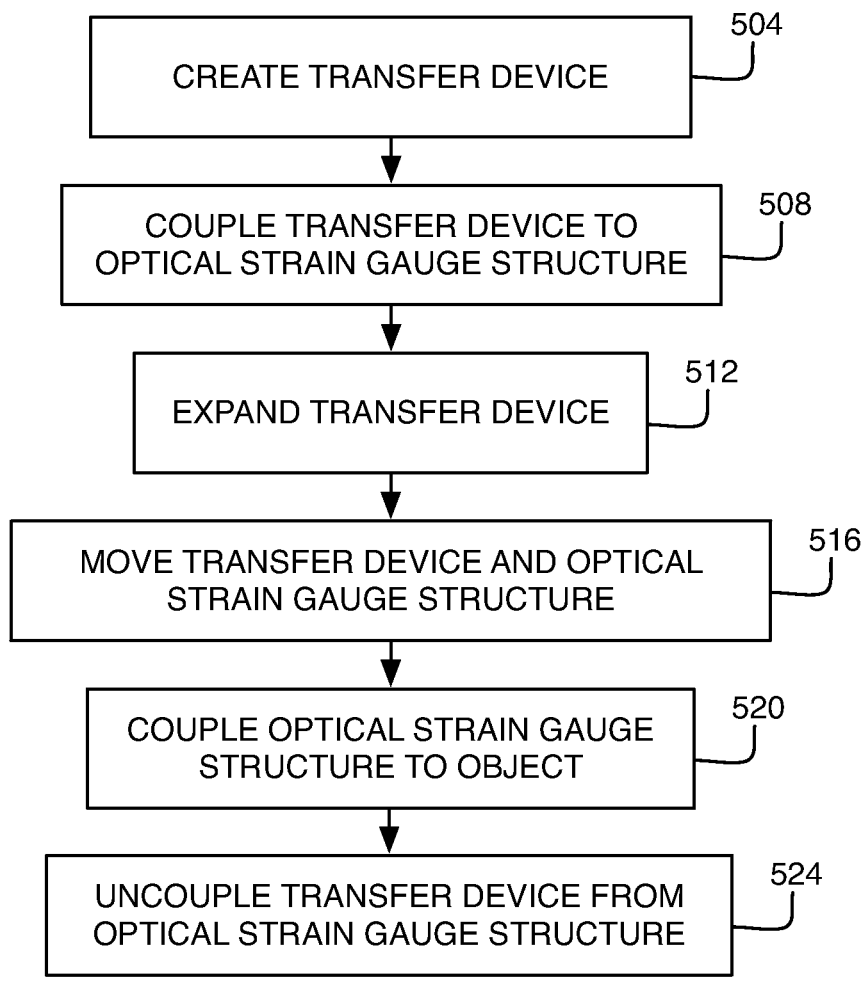
FIG. 5 is a flow chart depicting a method of transferring an optical strain gauge in accordance with embodiments of the present disclosure.

With reference now to FIG. 5, a method of transferring a strain gauge 108 will be described in accordance with embodiments of the present disclosure. The method begins with the creation of a transfer device 204 (step 504). Any type of strain gauge and corresponding structure (e.g., with or without end caps 116) may be constructed without departing from the scope of the present disclosure; accordingly, any type of transfer device 204 can be utilized.

After the transfer device 204 is created, the transfer device 204 is coupled to the strain gauge 108 (step 508). In some embodiments, the strain gauge 108 may correspond to an optical strain gauge 108. Furthermore, coupling the transfer device 204 to the strain gauge 108 may comprise moving individual piece parts into contact with components of the strain gauge 108. Alternatively, couple the transfer device 204 to the strain gauge 108 may comprise forming components of the transfer device 204 into components of the strain gauge 108.

Once the transfer device 204 is coupled to the strain gauge 108, the method continues with the expansion of the transfer device 204 (step 512). The expansion may continue until the ends of the strain gauge 108 are a predetermined distance apart and/or until a tension of the optical fibers 112 is substantially equal to the expansion forces applied by the transfer device 204.

Thereafter, the transfer device 204 and strain gauge 108 are moved to a desired location (step 516). For instance, the strain gauge 108 may be moved to an object 104. The method may continue with the coupling of the strain gauge 108 to the object (step 520). A final optional step may include uncoupling and removing the transfer device 204 from the strain gauge 108 (step 524). It should be appreciated that any time between the expansion of the transfer device 204 and the removal of the transfer device 204 from the strain gauge 108, the strain gauge 108 may be calibrated (e.g., have normal or non-stressed outputs determined).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A transfer device configured to transfer a strain gauge, the transfer device comprising:
   a first gauge coupler configured to interface with a first end of a strain gauge;
   a second gauge coupler configured to interface with a second end of the strain gauge; and
   an expander connectable between the first gauge coupler and second gauge coupler, the expander being configured to express an expansion force between the first and second gauge couplers.

2. The transfer device of claim 1, further comprising:
   a first expander attachment configured to interface a first end of the expander to the first gauge coupler; and a second expander attachment configured to interface a second end of the expander to the second gauge coupler.

3. The transfer device of claim 1, wherein at least one of the first expander attachment and second expander attachment are integral to the first gauge coupler and second gauge coupler, respectively.

4. The transfer device of claim 1, wherein the expander comprises a rod and at least one force-exerting component that is movable along the rod to create and transfer the expansion force to the first and second gauge couplers.

5. The transfer device of claim 4, wherein the rod is threaded and the at least one force-exerting component comprises a threaded nut.

6. The transfer device of claim 1, wherein at least one of the first gauge coupler and second gauge coupler comprise one or more features that interface with a respective first and second gauge coupler at predetermined locations of the respective first and second gauge coupler.

7. The transfer device of claim 6, wherein the one or more features comprise at least one of a male protrusion and female receiver.

8. The transfer device of claim 1, wherein the first gauge coupler and second gauge coupler are configured to be removed from the strain gauge after the strain gauge has been attached to an object.

9. The transfer device of claim 1, wherein the strain gauge is capable of being calibrated while attached to the transfer device.

10. A strain measurement system, comprising:
  a strain gauge comprising a first end and a second end, wherein movement of the first end relative to the second end is converted to a strain measurement by the strain gauge; and
  a transfer device configured to engage and move the strain gauge, the transfer device comprising:
    a first gauge coupler configured to interface with the first end of the strain gauge;
    a second gauge coupler configured to interface with the second end of the strain gauge; and
    an expander connected between the first gauge coupler and second gauge coupler, the expander being configured to adjust a distance between the first and second gauge couplers.

11. The system of claim 10, wherein the strain gauge comprises optical fiber.

12. The system of claim 11, wherein the optical fiber is pre-tensioned.

13. The system of claim 11, wherein the optical fiber meanders between the first end and the second end and wraps around the first end and second end.

14. The system of claim 13, wherein optical fiber wraps at least one of vertically and horizontally around the first end and second end.

15. The system of claim 11, wherein the first gauge coupler is configured to interface with the first end along at least two non-parallel surfaces of the first end.

16. The system of claim 15, wherein the first gauge coupler comprises an L-shape.

17. A system configured to move a strain gauge from a first location to a second location, the system comprising:
  an expander having a force-exerting component provided thereon;
  a first gauge coupler having a first expander attachment that facilitates an interface between the expander and the first gauge coupler; and
  a second gauge coupler having a second expander attachment that facilitates an interface between the expander and the second gauge coupler.

18. The system of claim 17, wherein the first expander attachment is integral with the first gauge coupler and wherein the second expander attachment is integral with the second gauge coupler.

19. The system of claim 17, wherein the force-exerting component comprises an expansion nut.

20. The system of claim 19, wherein the expander comprises a threaded rod on which the expansion nut rotates.

* * * * *